(12) United States Patent
Muenz

(10) Patent No.: US 11,385,465 B2
(45) Date of Patent: Jul. 12, 2022

(54) CURVED LIGHT GUIDE, IMAGING OPTICAL UNIT AND HMD

(71) Applicant: tooz technologies GmbH, Aalen (DE)

(72) Inventor: Holger Muenz, Aalen (DE)

(73) Assignee: tooz technologies GmbH, Aalen (DE)

( * ) Notice: Subject to any disclaimer, the term of this patent is extended or adjusted under 35 U.S.C. 154(b) by 44 days.

(21) Appl. No.: 16/641,250

(22) PCT Filed: Aug. 23, 2018

(86) PCT No.: PCT/EP2018/072757
§ 371 (c)(1),
(2) Date: Feb. 23, 2020

(87) PCT Pub. No.: WO2019/038374
PCT Pub. Date: Feb. 28, 2019

(65) Prior Publication Data
US 2020/0225475 A1    Jul. 16, 2020

(30) Foreign Application Priority Data

Aug. 24, 2017   (DE) .......................... 102017119440.1

(51) Int. Cl.
*G02B 27/01*     (2006.01)
*G02B 5/18*      (2006.01)
(Continued)

(52) U.S. Cl.
CPC ........... *G02B 27/0172* (2013.01); *G02B 5/18* (2013.01); *G02B 6/0076* (2013.01);
(Continued)

(58) Field of Classification Search
CPC ............ G02B 27/0172; G02B 27/0101; G02B 27/017; G02B 2027/013;
(Continued)

(56) References Cited

U.S. PATENT DOCUMENTS 6,462,882 B2   10/2002 Chen et al.
7,542,209 B2 *  6/2009 McGuire, Jr. ...... G02B 27/0081
                                                    359/630
(Continued)

FOREIGN PATENT DOCUMENTS

DE    102008009095 A1   8/2009
DE    102011007812 A1  10/2012
(Continued)

OTHER PUBLICATIONS

Ian M. Barton, Sham N. Dixit, Leslie J. Summers, Charles A. Thompson, Kenneth Avicola, and Julia Wilhelmsen, "Diffractive Alvarez lens," Opt. Lett. 25, 1-3 (2000) (Year: 2000).*

(Continued)

*Primary Examiner* — Zachary W Wilkes
(74) *Attorney, Agent, or Firm* — Skaar Ulbrich Macari, P.A.

(57) ABSTRACT

A curved light guide can be used as an imaging optical unit or as part of an imaging optical unit for an HMD. The light guide can be arranged in front of at least one eye and have a concave curvature, as seen from the eye. The light can include a back surface facing the eye and a front surface facing away from the eye, an input coupling structure for coupling light into the light guide in such a way that light is guided through the light guide with reflection at the front surface and/or the back surface, and an output coupling structure for coupling out the light guided through the light guide. The light guide can have a diverging structure, the absolute value of the focal length of which is less than or equal to the radius of curvature of the light guide.

16 Claims, 7 Drawing Sheets

(51) Int. Cl.
*F21V 8/00* (2006.01)
*G02B 27/28* (2006.01)

(52) U.S. Cl.
CPC .......... *G02B 27/283* (2013.01); *G02B 27/286* (2013.01); *G02B 2027/013* (2013.01)

(58) Field of Classification Search
CPC ...... G02B 2027/0178; G02B 2027/011; G02B 2027/0116; G02B 2027/0174
USPC .............................................. 359/13–14, 630
See application file for complete search history.

(56) References Cited

U.S. PATENT DOCUMENTS

| | | | |
|---|---|---|---|
| 8,139,103 B2* | 3/2012 | McGrew ............ | G02B 27/0101 348/40 |
| 8,320,032 B2 | 11/2012 | Levola | |
| 8,643,948 B2* | 2/2014 | Amitai ..................... | G02B 5/32 359/489.07 |
| 8,830,584 B2 | 9/2014 | Saarikko et al. | |
| 8,842,368 B2 | 9/2014 | Simmonds et al. | |
| 9,470,896 B2 | 10/2016 | Dobschal et al. | |
| 9,897,811 B2* | 2/2018 | Martinez ................ | G02B 27/01 |
| 10,120,191 B2 | 11/2018 | Rudolph et al. | |
| 10,139,626 B2 | 11/2018 | Dobschal et al. | |
| 10,191,288 B2 | 1/2019 | Singer et al. | |
| 10,437,006 B2 | 10/2019 | Kim et al. | |
| 2006/0012181 A1 | 1/2006 | Larsen | |
| 2010/0220295 A1 | 9/2010 | Mukawa et al. | |
| 2012/0002294 A1 | 1/2012 | Dobschal et al. | |
| 2012/0257278 A1* | 10/2012 | Simonov ............ | G11B 7/13927 359/557 |
| 2012/0300311 A1* | 11/2012 | Simmonds ......... | G02B 27/0081 359/630 |
| 2013/0088780 A1 | 4/2013 | Jarvenpaa et al. | |
| 2015/0205141 A1 | 7/2015 | Mansharof et al. | |
| 2017/0153455 A1* | 6/2017 | Takahashi .............. | G02B 5/189 |
| 2017/0357089 A1* | 12/2017 | Tervo ..................... | G02B 6/005 |

FOREIGN PATENT DOCUMENTS

| | | | | |
|---|---|---|---|---|
| DE | 102011055777 A1 * | 5/2013 | ......... | G02B 27/0056 |
| EP | 2246728 A1 | 11/2010 | | |
| WO | 2008023367 A1 | 2/2008 | | |

OTHER PUBLICATIONS

International Preliminary Report on Patentability rendered by the International Bureau of WIPO for PCT/EP2018/072757, dated Feb. 25, 2020, 6 pages.

Search Report by the German Patent Office for the German priority application No. 10 2017 119 440.1, dated May 22, 2018, 12 pages.

* cited by examiner

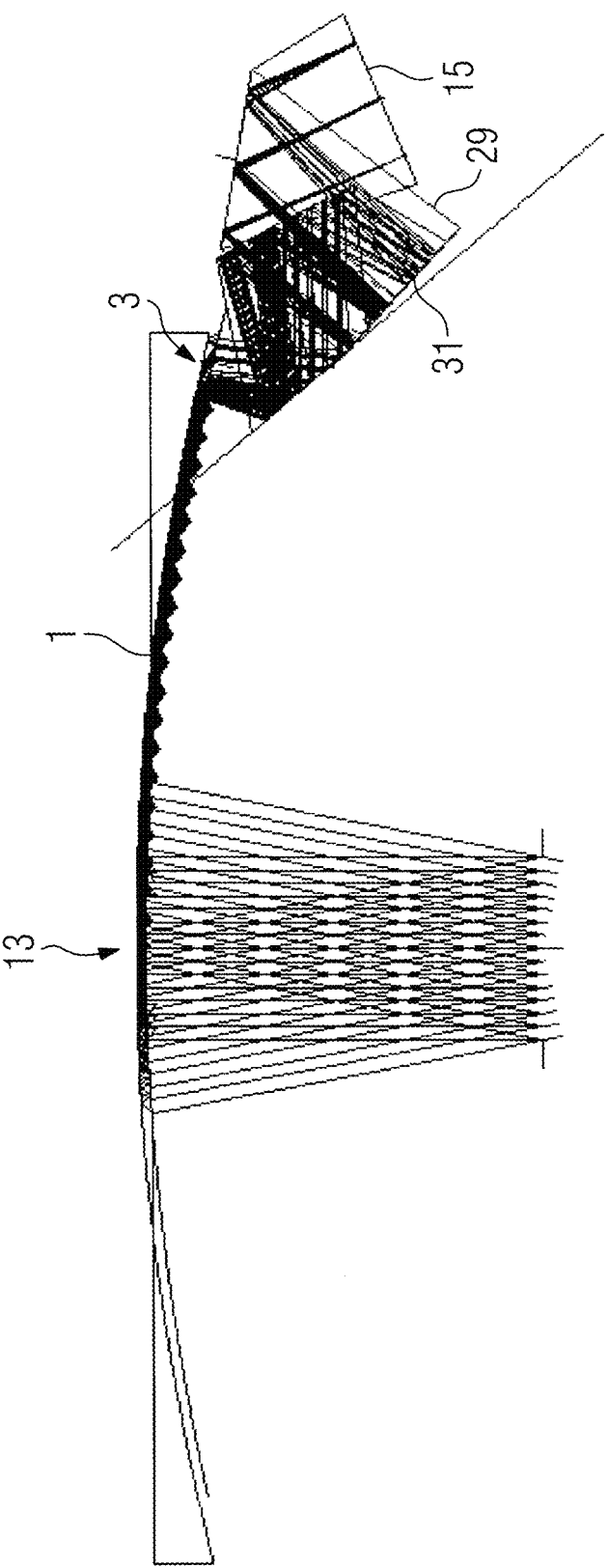

ically as seen from the eye, makes it possible to generate a virtual image at infinity or at a defined distance in front of the eye. A further object herein is to provide an advantageous imaging optical unit for an HMD which makes it possible to

CURVED LIGHT GUIDE, IMAGING OPTICAL UNIT AND HMD

PRIORITY

This application claims the benefit of German Patent Application No. 10 2017 119 440.1, filed on Aug. 24, 2017, and which is hereby incorporated herein by reference in its entirety.

FIELD

The present invention relates to a curved light guide for an HMD (Head Mounted Display), that is to say for a display device to be worn on the head. In addition, the invention relates to an imaging optical unit for an HMD and to the HMD itself.

BACKGROUND

An HMD is a display system in which an output image is imaged into the field of view of the wearer of the HMD with the aid of an imaging optical unit. In this case, it is often desirable also to allow an undisturbed view of the surroundings in addition to the image provided. This arrangement prevents solutions in which a non-transparent image generator and an associated imaging optical unit are arranged directly in front of the eye. In one class of HMDs, which occasionally are also called smartglasses, the output images are therefore usually generated outside the field of view of the eye, and the output image generated is reflected in the desired viewing direction in front of the eye with the aid of an imaging optical unit. For this purpose, the HMD comprises a light guide, for example, via which the imaging beam path for generating the virtual image is guided by internal reflection from an input coupling structure located outside the field of view to an at least partly transparent output coupling structure located in the field of view of the eye. In this case, the input and output coupling can be effected by means of refractive structures, by means of reflective structures or by means of diffractive structures. Diffractive input and output coupling structures are described for example in DE 10 2015 122 055 A1, in US 2006/012181 A1 and in US 2010/0220295 A1. Examples of reflective or refractive input or output coupling structures are described for example in US 2012/00002294 A1, in DE 10 2011 007 812 A1, in WO 2015/075206 A1 and WO 2015/075207 A1.

In order to obtain a large output pupil, U.S. Pat. No. 8,320,032 B2 proposes multiple output coupling. While U.S. Pat. No. 8,320,032 B2 describes a planar light guide, in U.S. Pat. No. 8,830,584 B2 the principle of multiple output coupling is applied to spherical light guides. For ideal multiple output coupling, in the case of a spherical-concentric light guide, the output coupling structures have to lie parallel to the circles of latitude on the sphere. Light can thus be transferred from the input coupling structure to the output coupling structure and be coupled out multiply there. In this regard, it is possible to realize an ideal point-to-point imaging in the center of the sphere. Multiple output coupling is moreover also described in DE 10 2015 122 055 A1.

In US 2013/0088780 A1, the principle of point-to-point imaging is used to realize different focal planes by means of a plurality of light guides. In this case, however, the light guides have to be curved away from the eye, such that the light guides have a convex curvature, as seen from the eye. For esthetic reasons, however, the light guides should have a concave curvature, as seen from the eye, such that the head mounted display can adopt the form of conventional spectacles.

In addition, a head mounted display with diffractive input and output coupling is described in U.S. Pat. No. 8,842,368 B2, in which display curved diffractive structures are used to generate a pupil imaging. However, this pupil imaging would not be compatible with multiple output coupling.

US 2012/0300311 A1 describes a head mounted display comprising a cylindrically curved light guide and with diffractive input and output coupling. In order to achieve the effect that a collimated image coupled into the light guide can be coupled out as a collimated image with a magnified exit pupil, the input coupling grating and the output coupling grating have variable grating spacings in the direction of curvature of the light guide.

DE 10 2012 213 685 A1 describes a display device in which beams of rays coupled into a curved light guide are converted, before the input coupling, into collimated beams of rays by means of an additional optical unit arranged between the image generator and the light guide and are coupled out of the light guide as collimated beams of rays. The collimation can be performed by the input coupling grating used for the input coupling, instead of by the additional optical unit 9.

DE 10 2015 122 055 A1 describes a display device comprising a correction arrangement for correcting imaging aberrations.

DE 10 2008 009 095 A1 describes a transmitted-light display system in which an image is visible through a plate into which an intermediate image generated by an image generator on a diffusing plate is coupled by means of an imaging lens. A correction lens is arranged between the diffusing plate and the imaging lens, with the aid of which correction lens the image quality is intended to be optimized.

DE 602 05 722 T2 describes a relay lens systems which projects an image generated by an image source onto a curved visor to be worn in front of an eye, from where the light coming from the relay lens system is reflected in the direction of the eye. The relay lens system includes an optical element that carries out a chromatic correction.

WO 2008/023367 A1 describes an input coupling module for coupling a beam path into a light guide. The input coupling module comprises a polarization beam splitter and a retardation plate.

SUMMARY

An object herein is to provide an advantageous light guide for an HMD which, with a light guide curved concavely as seen from the eye, makes it possible to generate a virtual image at infinity or at a defined distance in front of the eye. A further object herein is to provide an advantageous imaging optical unit for an HMD which makes it possible to generate a virtual image at infinity or in a defined image plane in front of the eye with the use of a light guide curved concavely as seen from the eye, in particular a spherically concavely curved light guide. A third object herein is to provide an HMD which comprises a light guide curved concavely as seen from the eye, in particular a spherically concavely curved light guide, and which is able to generate a virtual image at infinity or in a defined image plane in front of the eye.

The disclosure includes a curved light guide, an imaging optical unit, and an HMD.

When used as intended, a curved light guide for an HMD is arranged in front of at least one eye and has a concave curvature, in particular a spherically concave curvature, as seen from the eye. Said light guide comprises a back surface facing the eye and a front surface facing away from the eye.

Moreover, said light guide comprises an input coupling structure for coupling light into the light guide in such a way that light is guided through the light guide with reflection at the front surface and/or the back surface, and an output coupling structure for coupling out the light guided through the light guide. Such a light guide has a converging effect on the light coupled in.

Therefore, the light guide has a diverging structure, the absolute value of the focal length of which is less than or equal to the radius of curvature of the light guide. The diverging structure can be superimposed on the output coupling structure or the input coupling structure, with the result that there is no need for an additional optical element to be integrated into the light guide.

However, there is also the possibility of dividing the focal length of the diverging structure between two substructures and of superimposing one substructure on the input coupling structure and the other substructure on the output coupling structure.

The integration of a diverging structure into the light guide makes it possible to use the light guide for generating a virtual image situated beyond the light guide, as seen from the eye. In this case, if the absolute value of the focal length of the diverging structure is equal to the radius of curvature of the light guide, the image is at infinity; if the absolute value of the focal length of the diverging structure is less than the radius of curvature of the light guide, that is to say the diverging effect of the diverging structure is greater than the converging effect of the light guide, the virtual image is situated at a distance from the eye which is determined according to the strength of the diverging effect, i.e. according to the focal length of the diverging structure.

The diverging structure can be in particular a diffraction lens, e.g. in the form of a volume hologram or a blazed grating. The diverging effect of the diffraction lens is determined by the focal length thereof. In order to generate a virtual image at infinity, use is made here of a diffraction lens, the absolute value of the focal length of which is equal to the radius of curvature of the light guide. This holds true particularly if, in the light guide, the centers of curvature of the front surface and of the back surface coincide. If the centers of curvature of the front surface and of the back surface do not coincide or if the light guide has a curvature deviating from spherical curvature, for example because, in the context of smartglasses, said light guide is intended simultaneously to be used for correcting defective vision, this relationship holds true only approximately. The exact focal length of the diffraction lens for generating a virtual image is then dependent on the concrete curvature of the light guide and can be determined, if appropriate, approximately or experimentally. By way of example, the focal length of the diffraction lens can be less than or equal to the smaller of the two radii of curvature of the front surface and the back surface of the light guide if the centers of curvature of the front surface and of the back surface do not coincide. In this case, the virtual image is possibly not at infinity, but is situated at a great distance from the light guide, such that it can be regarded as being approximately at infinity. In the case of an experimental determination, it is possible to ascertain that point at which a divergent beam of rays emanating from a point light source is imaged into infinity by the light guide without the diverging structure and the distance between said point and the back surface of the light guide can be regarded as the radius of curvature thereof.

A diffraction lens focuses the light to the focal point by means of interference, wherein constructive interference is present at the focal point and destructive interference is present outside the focal point. The focal point is typically formed by the first diffraction maximum occurring during diffraction. In order to bring about the corresponding diffraction, the diffraction lens can comprise either alternating transparent and nontransparent zones or alternating zones having a shorter and a longer optical path length for the light passing for the diffraction lens. In this case, the spacings and the width of the zones of the diffraction lens depend on the wavelength of the light and the desired focal length of the diffraction lens. In the case of alternating transparent and nontransparent zones, the diffraction is produced by virtue of the fact that only specific parts of the wavefront can pass through the diffraction lens, wherein the parts that pass through interfere with one another constructively in specific directions and interfere with one another destructively in other directions. In the case of zones having different optical path lengths, upon the wavefront passing through the different zones of the diffraction lens, a phase shift takes place between the parts of the wavefront which pass through the different zones. Said phase shift has the effect that the different parts of the wavefront interfere with one another constructively in specific directions and interfere with one another destructively in other directions. The configuration of the diffraction lens having transparent and nontransparent zones affords the possibility of producing the diffraction lens using relatively simple means. By contrast, the production of a diffraction lens comprising zones having different optical path lengths affords the advantage that, in an augmented reality application, it has no influence on the ambient light passing through the light guide from outside and, consequently, does not weaken the perception of the surroundings.

However, the diverging structure results in an axial chromatic aberration and a lateral chromatic aberration. An axial chromatic aberration means that the focal points of light of different colors (wavelengths) are at different distance from the diverging structure, such that only light of one color is focused at a specific focal point, while the light of other colors has a slight defocus at this focal point. By contrast, a lateral chromatic aberration is the consequence of different imaging scales of the diverging structure for light of different colors (wavelengths) of the light guided through the light guide, which results in colored fringes in the imaging. While the axial chromatic aberration is generally small enough to be able to dispense with a correction, the lateral chromatic aberration at the field edge of the image field can become so great that it is perceived as disturbing. In order to minimize the lateral chromatic aberration induced by the diverging structure, it is therefore advantageous if the diverging effect of the diverging structure is centered on the center of the image field.

In each case only a specific angular spectrum of the beam path can be transmitted through the light guide. The smaller the angular spectrum, the smaller the image field that can be transmitted through the light guide. In order to be able to transmit a large angular spectrum for a large image field, there is the possibility that the input coupling structure and the output coupling structure each comprise a plurality of substructures which respectively couple different parts of the angular spectrum of the light into the light guide and out of the light guide. These different parts of the angular spectrum can then be designed such that they correspond in each case to the maximum of the angular spectrum that can be transmitted by the light guide. The total angular spectrum of the transmitted light then results from the combination of the two parts, such that overall a large angular spectrum can be transmitted, such that a large image field is able to be generated.

Furthermore, diffractive input and output coupling structures are optimized in each case for a specific length wave. With increasing deviation from this optimized wavelength, interference that is usable for the output coupling no longer arises. The wavelength spectrum of the light that is to be coupled in and in out by means of the input and output coupling structures is therefore limited. If an image having a wide wavelength spectrum, ideally a color image, is intended to be generated, it is therefore advantageous if the output coupling structure comprises in each case a plurality of substructures which respectively couple different parts of the spectral range of the light that is to be coupled into the light guide into the light guide and out of the light guide.

In order to be able to generate a color image, therefore, in one particular configuration of the light guide, an input coupling structure and an output coupling structure are present, each of which comprises three substructures, of which for example one is optimized for blue light, one for green light and another for red light. If the angular spectrum is then also divided into a plurality of parts, said substructures each have to be present multiply, namely in each case once for each part of the angular spectrum. Overall, therefore, in the case of an angular spectrum divided into two parts, and three colors, this results in six substructures. If the angular spectrum is intended to be divided into n parts, this correspondingly results in 3n substructures for the input coupling structure and 3n substructures for the output coupling structure. In this case, there is the possibility of guiding the different spectral ranges and/or the different parts of the angular spectrum through a common light guide, or of dividing the light guide into a plurality of sub-light waveguides which guide different spectral wavelength ranges and/or different parts of the angular spectrum. In this case, said sub-light guides can be regarded as separate transmission channels. The presence of different transmission channels makes it possible reliably to avoid crosstalk of the transmitted signals. By contrast, the transmission of a plurality of spectral ranges and/or parts of the angular spectrum through a common light guide reduces the complexity of the light guide and thereby simplifies the production thereof.

The light rays can be coupled into the light guide in particular in such a way that the light rays coupled in pass along great circles extending on the spherical front surface and/or the spherical back surface of the light guide through those points which, in spherical coordinates, are given by the polar angles 0° and 180°. In general, these points are themselves not part of the spherical front surface and/or of the spherical back surface of the light guide since these represent only a segment of an imaginary sphere surface containing these points. On the surface of the Earth, such great circles correspond to the circles of longitude. Therefore, the great circles are referred to hereinafter as circles of longitude of the light guide. In this way, for all circles of longitude along which the light rays coupled in pass, there exists a great circle intersecting these circles of longitude at right angles, that is to say a great circle through which the light rays pass at right angles or would pass at right angles if the light rays are coupled out before actually reaching this great circle. The great circle intersecting the circles of longitude at right angles thus extends substantially parallel to the structure elements of the input coupling structure and of the output coupling structure, i.e. parallel to the grating structures in the case of diffractive input and output coupling or parallel to the boundary lines between Fresnel structures in the case of reflective or refractive input and output coupling. On the surface of the Earth, the intersecting great circle would correspond to the equator. Therefore, the great circle intersecting the circles of longitude at right angles is called hereinafter the equator of the light guide. In this case, it is particularly advantageous if the diverging structure is integrated into the output coupling structure since then the course of the light rays along circles of longitude within the light guide is not influenced by the diverging effect of the diverging structure. The course of the light rays along circles of longitudinal within the light guide opens up the possibility of the output coupling structure being arranged closer to the equator of the light guide than the input coupling structure. In this case, it can be advantageous if the output coupling structure is arranged no further than 5 degrees, preferably no further than 3 degrees, from the equator of the light guide. In particular, the output coupling structure can be arranged here such that the equator of the light guide also intersects the output coupling structure, in particular such that the equator also symmetrically intersects the output coupling structure. As a result of the proximity of the output coupling structure to the equator of the light guide, the circles of longitude along which the light rays propagate intersect the structure elements of the output coupling structure almost at right angles, such that the light rays impinge on the structure elements of the output coupling structure almost at right angles. As a result, differences in the pupil shape that are attributable to a different number of reflections within the light guide can be minimized. Different numbers of reflections within the light guide can result in the diffraction lens being used at different locations, which can result in a pupil distortion that may need to be corrected. With the arrangement of the output coupling structure near the equator, the pupil distortion can be reduced and possibly minimized.

Additionally provided is an imaging optical unit comprising an imaging beam path, a light guide and at least one image-forming optical element. The imaging optical unit is distinguished by the fact that it comprises a light guide, wherein the light guide serves as the at least one image-forming optical element. In this case, the imaging optical unit can in particular also consist exclusively of the light guide. The fact that the light guide simultaneously functions as an image-forming optical element makes it possible to produce a compact imaging optical unit. In this case, given a concave curvature of the light guide, in particular a spherically concave curvature of the light guide, as seen from the eye, the light guide makes it possible to provide a virtual image which, as seen from the eye, is situated at a finite or infinite distance beyond the light guide.

In one development of the imaging optical unit, a correction element for correcting in advance a trapezoidal pupil distortion induced by the light guide is disposed upstream of the input coupling structure of the light guide. in the imaging beam path. Said correction element generates an inverse pupil distortion with respect to the pupil distortion induced by the light guide. The two pupil distortions then mutually compensate for one another. Additionally or alternatively, a compensation optical unit that compensates for a static lateral chromatic aberration can be disposed upstream of the output coupling structure of the light guide in the imaging beam path. The static lateral chromatic aberration is induced by the light guide containing the diverging structure and is independent of the eye movement. Said aberration can therefore be compensated for straightforwardly by an optical compensation optical unit. Said compensation optical unit induces an inverse lateral chromatic aberration with respect to the lateral chromatic aberration induced by the light guide, with the result that the two lateral chromatic aberrations cancel one another out. If a manipulator is disposed upstream of the input coupling structure of the light guide in the imaging beam path, said manipulator comprising a diffractive optical element and a refractive optical element, which are arranged such that they are displaceable relative to one another perpendicular to the optical axis of the imaging beam path, and an eye tracker for detecting the viewing direction of the eye is additionally present, it is moreover possible for a dynamic, field-constant lateral chromatic aberration brought about by the light guide to be corrected in advance. A dynamic lateral chromatic aberration arises as a result of eye movements, at least if the chromatic bandwidth of the transmitted light exceeds a certain threshold.

Moreover, a polarization beam splitter and a retardation plate can be disposed upstream of the input coupling structure of the light guide in the imaging beam path. A polarization beam splitter in conjunction with the retardation plate enables the imaging beam path to be coupled in through the input coupling structure with at the same time compact dimensions of the imaging optical unit.

Further provided is an HMD comprising a display for displaying an output image and an imaging optical unit for generating a virtual image from the output image. Since the imaging optical unit can be embodied compactly owing to the use of the light guide as an image-forming optical element, it is possible, through the use of the imaging optical unit, also to provide a compact HMD which makes it possible, in the case of a light guide curved concavely, as seen from the eye, to generate a virtual image which, as seen from the eye, is situated beyond the light guide at infinity or at a specific distance from the light guide.

Further features, properties and advantages of the present invention will become apparent from the following description of exemplary embodiments with reference to the accompanying figures.

BRIEF DESCRIPTION OF THE DRAWINGS

FIG. 12 shows one example of a compact imaging optical unit.

Figure 1:
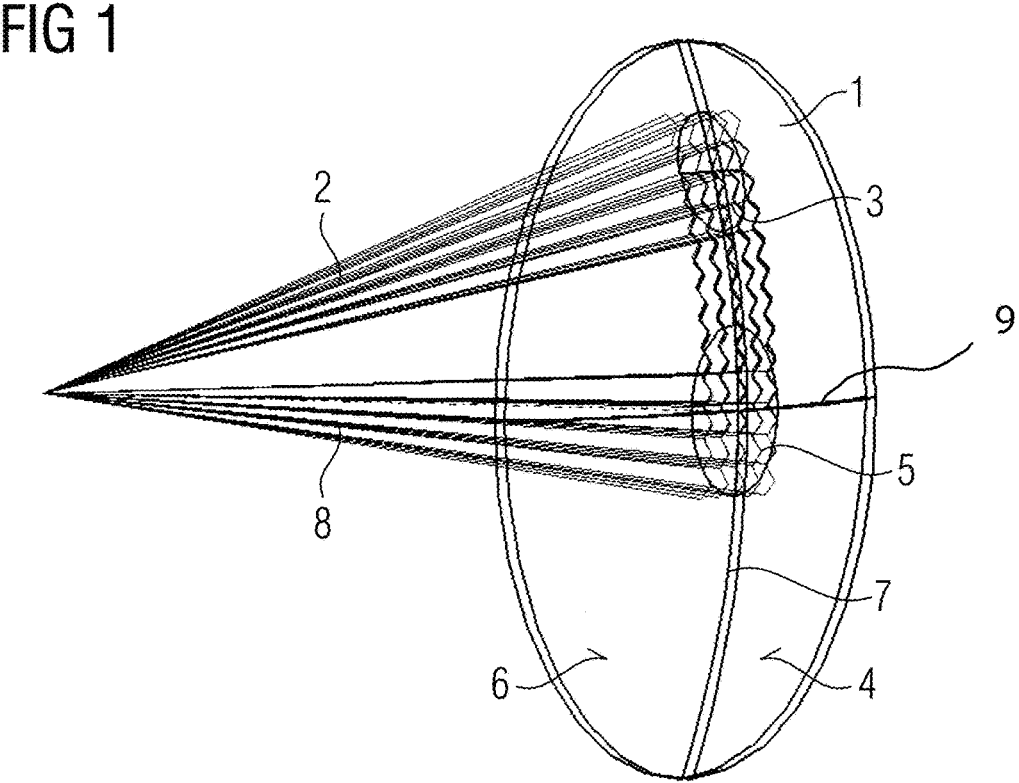
FIG. 1 shows an ideal point-train-point imaging such as can be achieved with a spherical light guide.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Before the principle underlying the invention is discussed below with reference to FIG. 2, the effect of a spherical light guide is explained with reference to FIG. 1.

Figure 2:
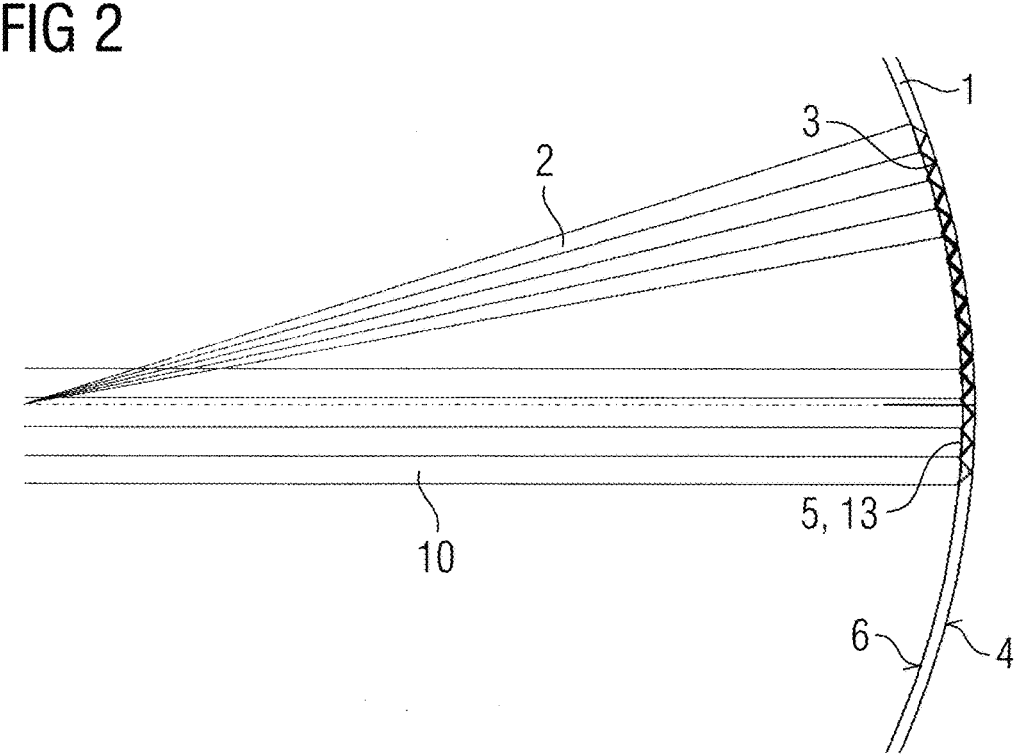
FIG. 2 shows a curved light guide with an imaging to infinity.

FIG. 1 shows a spherical light guide 1 comprising a diffractive input coupling structure 3 located at the edge of the light guide, and a diffractive output coupling structure 5 located in the center of the light guide. The connecting line between the center of the input coupling structure 3 and the center of the output coupling structure 5 extends substantially along a circle 7 of longitude of the sphere of the light guide 1, that is to say along a great circle extending through those points of a sphere—of which the light guide constitutes a part—which, in spherical coordinates, are given by the polar angles 0° and 180°. In the present exemplary embodiment, the output coupling structure 5 is situated on the equator 9 of said sphere, in such a way that it is intersected symmetrically by the equator 9.

The diffractive input coupling structure 3 and the diffractive output coupling structure 5 are each formed by diffraction gratings having a specific grating vector, the grating lines of which run parallel to circles of latitude, that is to say parallel to the equator 9. By means of the diffraction grating forming the diffractive input coupling structure 3, a divergent beam 2 of rays emanating from the center of the sphere of the light guide 1 is deflected in such a way that the individual rays of the beam of rays in the light guide 1 impinge on the front surface 4 of the light guide 1, said front surface facing away from the eye when the light guide is used as intended in an HMD, in such a way that they are reflected by total internal reflection in the direction of the back surface 6 of the light guide 1, said back surface facing the eye when the light guide is used as intended in an HMD, at which back surface they are in turn reflected by total internal reflection in the direction of the front surface 4 of the light guide 1. In this way, the rays of the beam of rays are guided by multiple total internal reflection at the front surface 4 and the back surface 6 of the light guide 1 to the output coupling structure 5, where they are deflected by means of the diffraction grating in such a way that they emerge from the back surface 6 of the light guide 1. In this case, the beam of rays emerging from the back surface 6 of the light guide 1 is a beam 8 of rays that is convergent in such a way that its rays are focused again at the center of the sphere of the light guide 1. The light guide 1 shown in FIG. 1 comprising the diffractive input coupling structure 3 and the diffractive output coupling structure 5 thus images a point located at the center of the sphere of the light guide 1 ideally onto itself.

However, the light guide 1 as shown in FIG. 1 is useful only to a limited extent for use as part of an imaging optical unit of an HMD. In an HMD there is usually a desire to generate an image at infinity, which the user of the HMD can view with a relaxed eye, or an image situated at a defined distance from the eye beyond the light guide, such that the user has the impression that the image is floating at a specific distance in front of the user's eye. In other words an imaging optical unit comprising the light guide is intended to be able to generate a virtual image beyond the light guide. It is true that in principle there would be the possibility that to generate such a virtual imaging beams of rays coupled out by the output coupling structure 5 by means of a lens arranged between the output coupling structure and the eye. However, arranging a lens between the light guide and the eye is not desirable since firstly, there is only little room for such a lens between the light guide and the eye and, secondly, an endangerment of the eye by an optical element situated directly in front of the eye in the event of the HMD being subjected to a blow ought to be avoided. Moreover, the lens would also affect the image of the surroundings.

The invention therefore proposes integrating a diverging structure into the light guide 1 itself, the absolute value of the focal length of which diverging structure is less than or equal to the radius of curvature of the light guide 1. By virtue of said diverging structure, the beam of rays coupled out from the light guide 1 by means of the output coupling structure 5, as illustrated in FIG. 2, becomes a parallel beam 10 of rays if the absolute value of the focal length of the diverging structure is equal to the radius of curvature of the light guide 1, or becomes a divergent beam of rays if the absolute value of the focal length of the diverging structure is less than the radius of curvature of the light guide 1 (not illustrated in the figure). If the absolute value of the focal length of the diverging structure is equal to the radius of curvature of the light guide 1, the light guide 1 thus constitutes an image-forming optical element of an imaging optical unit which generates a virtual image at infinity. By contrast, if the absolute value of the focal length of the diverging structure is less than the radius of curvature of the light guide 1, the beam of rays coupled out from the light guide 1 is divergent, such that the light guide 1 constitutes an image-forming optical element of an imaging optical unit which generates a virtual image at a defined distance from the eye beyond the light guide 1. In this case, the imaging optical unit can consist solely of the light guide or comprise further optical elements, for instance elements for correcting image aberrations, as will be described further below.

The diverging structure can be a refractive, reflective or diffractive structure integrated into the light guide 1. A diffractive structure in the form of a diffraction lens is used in the present exemplary embodiment. The use of a diffractive structure is advantageous here in so far as it can be made very thin, such that the thickness of the light guide 1 need not, or not significantly, increase. Moreover, the diffractive diverging structure can be integrated into the diffractive output coupling structure 5 and/or the diffractive input coupling structure 3. In the case of multiple output coupling, it is particularly advantageous to integrate the diffractive diverging structure into the diffractive output coupling structure 5 since, as a result, the light path in the glass is not influenced. This is explained below with reference to FIGS. 3 to 5 on the basis of the example of integration into the output coupling structure 5.

Figure 3:
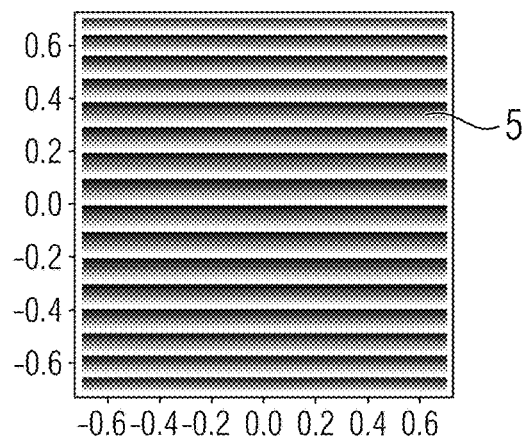
FIG. 3 shows one example of a diffractive output coupling structure for coupling out a beam of rays transmitted through the light guide.

FIG. 3 shows an exemplary diffractive output coupling structure 5 in the form of a diffracting grating, the grayscale levels indicating the phase deviation to be produced in the range of 0-1λ. The output coupling structure comprises parallel grating structures extending along circles of latitude of the sphere of the light guide 1 in the present exemplary embodiment. A diffractive output coupling structure 5 as shown in FIG. 3 results in the convergent beam 8 of rays shown in FIG. 1 and thus in the point-train-point imaging from FIG. 1.

Figure 4:
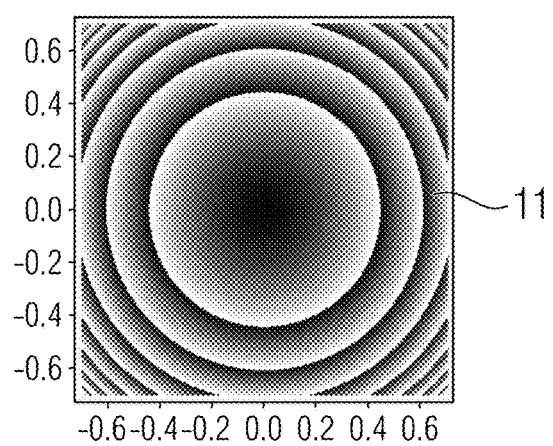
FIG. 4 shows a diffraction lens.

FIG. 4 shows a diffraction lens 11. In the present exemplary embodiment, the focal length of the diffraction lens 11 is equal to the radius of curvature of the sphere of the light guide 1. The diffraction lens 11 is a concentric diffraction grating, having a ringlike grating structure. In this case, the ringlike grating structure can be formed either by alternately arranged ring-shaped transparent and nontransparent zones or by alternately arranged ring-shaped zones having different optical path lengths, such that rays passing through adjacent zones experience a different phase shift. In both cases, interference occurs after passage through the diffraction lens, said interference reinforcing the rays in specific spatial regions by constructive interference and attenuating them in other spatial regions by destructive interference. The deflection angles at which constructive and destructive interference occurs are dependent here on the distance between two adjacent ring-shaped structures. The closer the distance, the larger the angles at which the first-order diffraction maximum (that is to say the first constructive interference) occurs. By reducing the distances toward the edge of the diffraction lens, it is possible to adapt the deflection angles to one another such that the deflected rays meet with constructive interference at a specific distance from the lens. This distance is then the focal distance of the diffraction lens 11. In this case, by way of example, the +1 order of diffraction can be used for converging light incident on the diffraction lens 11 and the −1 order of diffraction can be used for diverging light incident on the diffraction lens 11.

If the +1 order of diffraction is used, a parallel beam of rays would thus become a convergent beam of rays focused at the focus of the diffraction lens 11. By contrast, with use of the −1 order of diffraction, a parallel beam of rays would become a divergent beam of rays upon passing through the diffraction lens 11. In the present exemplary embodiment, the diffraction lens 11 is embodied such that the −1 order of diffraction is used.

Figure 5:
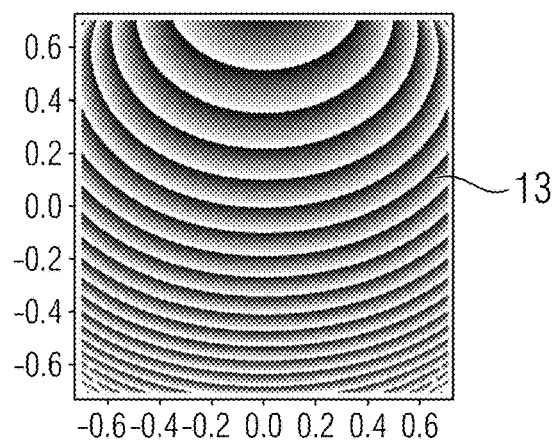
FIG. 5 shows the output coupling structure resulting from a superimposition of the output coupling structure from FIG. 3 and the diffraction lens from FIG. 4.

The diffraction lens 11 shown in FIG. 4 is superimposed on the output coupling grating of the output coupling structure 5 as shown in FIG. 3. The result of the superimposition is illustrated in FIG. 5. An output coupling structure 13 of this type is used in the lens light guide 1 illustrated in FIG. 2 instead of the output coupling structure 5 from FIG. 5.

As already mentioned, the diverging effect in the present exemplary embodiment in the form of the diffraction lens 11 is integrated completely into the output coupling structure 13. However, there is also the possibility, in principle, of integrating the diverging structure for example in the form of the diffraction lens described into the input coupling structure 3. Moreover, there is also the possibility of integrating a respective diverging effect both into the input coupling structure 3 and into the output coupling structure 13, the sum of which diverging effects corresponds to the diverging effect of the diffraction lens from FIG. 4. Corresponding divided diffraction lenses can be designed straightforwardly by a person skilled in the art. A diverging structure integrated exclusively into the output coupling structure 13 affords the advantage over the other variants, however, that the diverging effect does not influence the guiding of light through the light guide.

The grating structures having different optical path lengths as described with reference to FIGS. 3 to 5 can be produced for example by means of holographic exposure on the curved surface of the light guide. It is true that in principle there is also the possibility of producing grating structures by way of transparent and nontransparent regions of the light guide, wherein the nontransparent regions can be printed on, for example, but this results in a loss of light for the ambient light passing through the light guide. Particularly in the context of an HMD embodied as an augmented reality display, in which the image to be displayed is intended to be perceived as having been inserted into the surroundings, grating structures having different optical path lengths afford the advantage, however, that the ambient light is not attenuated.

Furthermore, it should be mentioned that the position of the input coupling structure 3 and the position of the output coupling structure 13 on the light guide can be chosen freely, in principle. It should be noted, however, that the rays associated with a field point pass along non-parallel great circle within the light guide, which depending on the position of the input coupling structure and the output coupling structure, results in more or less trapezoidal pupil distortion and thus in astigmatism in the field. Ideally, therefore, the output coupling structure lies in proximity to the equator 7 of the sphere of the light guide 1 in order to minimize the pupil distortion and thus the astigmatism. Typically, given a pupil diameter of 3 mm, it is thus possible to achieve a geometric spot size at the field edge of 1 to 2 arcminutes, which is generally perceived as not disturbing any more.

In the exemplary embodiment of the invention described with reference to FIG. 2, a light guide 1 comprising a single light-guiding structure for guiding the light from the input coupling structure 3 to the output coupling structure 13. With such a light guide, the field angle ranges to be transmitted are relatively limited and are insufficient for transmitting an image in the 16:9 format with an image diagonal of 70°. In order nevertheless to make it possible to transmit such an image, a field angle range extending over a field angle α is divided into a plurality of partial field angle ranges, and these partial field angle ranges are then transmitted separately from one another through the light guide. This is described below on the basis of the example of a division of the field angle range extending over the field angle α into two field angle ranges extending over field angles α1, α2. The division of the field angle range into two field angle ranges is illustrated schematically in FIG. 6. The figure shows a display 15 and the field angle α at which the display 15 is viewed. Said field angle is divided into two field angles α1 and α2, which do not overlap one another in the present example. However, there is also the possibility, in principle, of allowing an overlap of the partial field angles $\alpha_1$, $\alpha_2$. In this case, the partial field angles $\alpha_1$, $\alpha_2$ can be chosen such that they each cover the largest field angle range that is able to be transmitted by a light guide as illustrated in FIG. 2. In order to transmit the entire field angle range given by the field angle α, two light guides such as have been described with reference to FIG. 2 and which are referred to hereinafter as sub-light guides $1_1$, $1_2$ of the light guide 1 are then arranged one behind the other. This arrangement is illustrated schematically in FIGS. 7 and 8. FIG. 7 shows here, in a section along a circle of longitude, the two sub-light guides $1_1$ and $1_2$ comprising the input coupling structures $3_1$ and $3_2$, said sub-light guides being arranged one behind the other. Each of the input coupling structures $3_1$, $3_2$ is assigned a dedicated display $15_1$, $15_2$, which each display the image region to be perceived at the corresponding field angle range α1, α2. As already mentioned, the field angles $\alpha_1$, $\alpha_2$ are chosen such that the field angle ranges covered by them can be completely transmitted by the respective light guide $1_1$, $1_2$. By way of example, if the field angle α is 40° and the associated field angle range extends from −20° to +20°, the partial field angles $\alpha_1$, $\alpha_2$ can be 20°, for example wherein the partial field angle α1 covers a field angle range of −20° to 0° and the partial field angle $\alpha_2$ covers a field angle range of 0° to +20°. Since the sub-light guides $1_1$, $1_2$ arranged one behind the other transmit the complete image jointly, they form the light guide 1 jointly.

Figure 8:
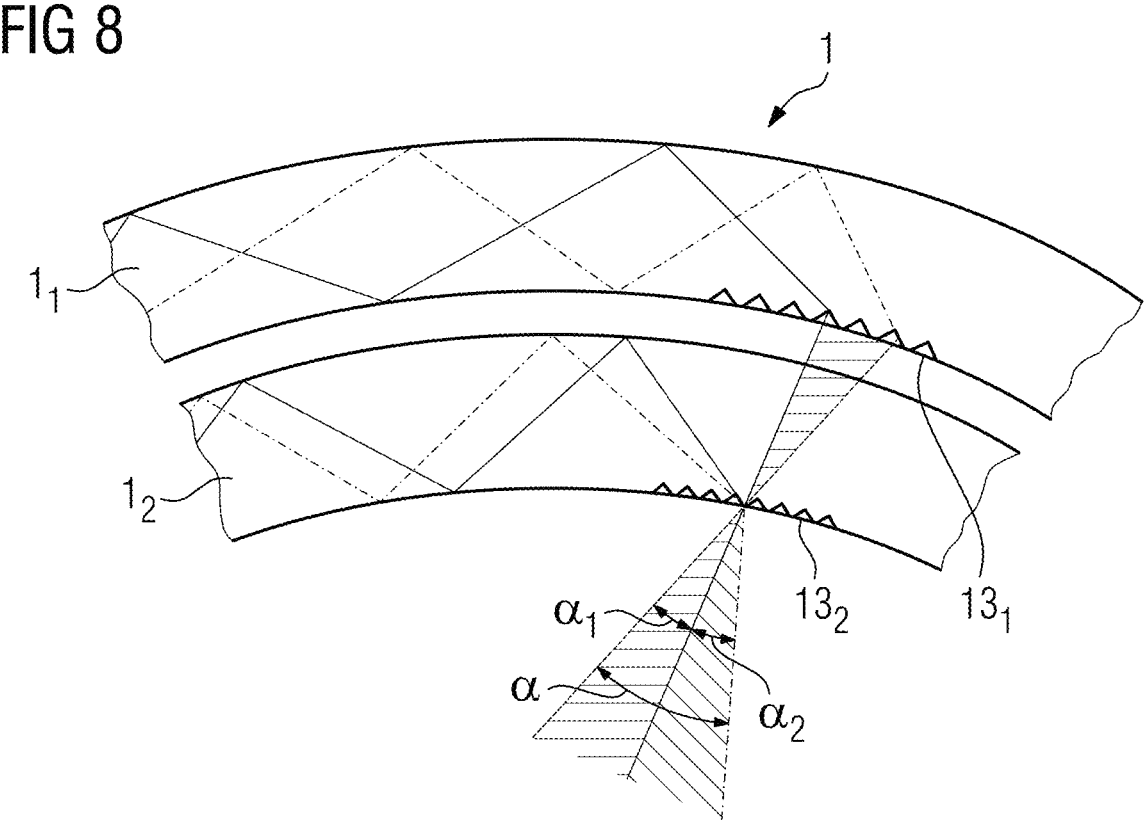
FIG. 8 shows the output coupling of the beam of rays transmitted through the light guides from FIG. 7.

The output coupling from the light guide 1 constructed from sub-light guides $1_1$, $1_2$ is illustrated schematically in FIG. 8. Each of the sub-light guides $1_1$, $1_2$ comprises an output coupling structure $13_1$, $13_2$, which substantially corresponds to the output coupling structure 13 from FIG. 2. However, the structures of the basic gratings 5 on which the diffraction lens is superimposed are chosen such that the light guided through the sub-light guides $1_1$, $1_2$ is coupled out at the correct angles. The input coupling structures $3_1$, $3_2$ are correspondingly adapted to the basic gratings of the output coupling structures $13_1$, $13_2$. As a result, the field angle ranges defined by the partial field angles $\alpha_1$, $\alpha_2$ are combined again to form the field angle range having the aperture angle α. This procedure is also called field stitching and is described in detail in WO 2017/102795 A1. Reference is made to said document regarding further details concerning field stitching.

By using a suitable number of sub-light guides in the light guide 1, it is possible to realize a sufficiently large field of view. Since diffractive input coupling and output coupling structures, in particular, can be made very flat, a larger number of sub-light guides can also be arranged one behind another.

Figure 9:
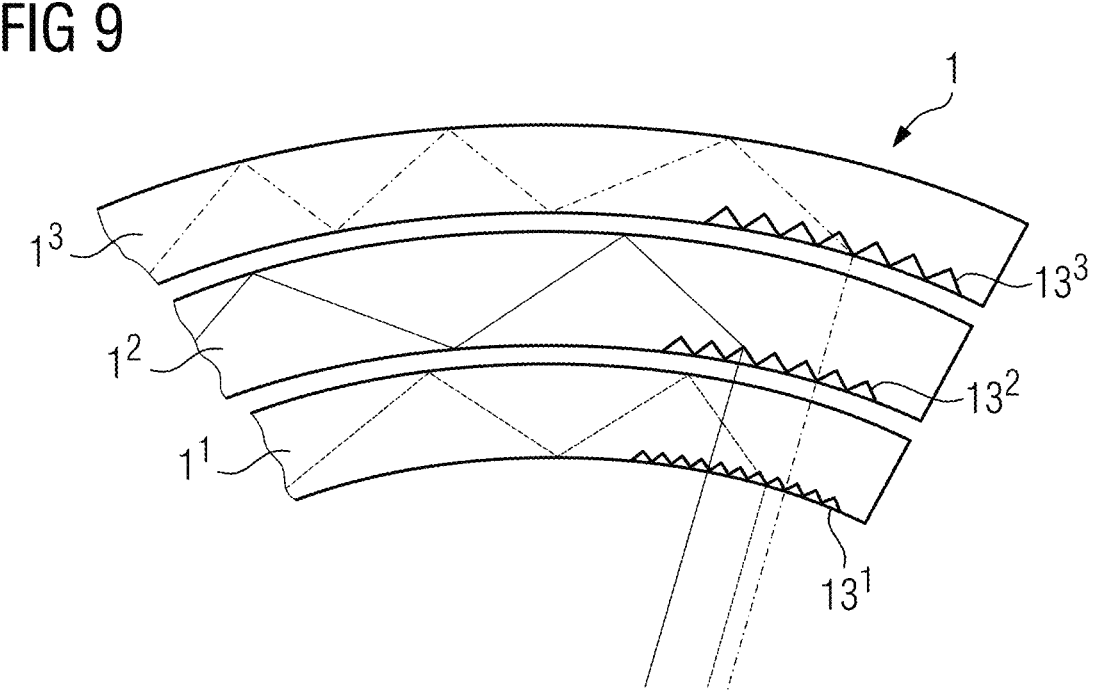
FIG. 9 shows a light guide comprising three substructures, each of which is suitable for coupling out a different spectral range.

Furthermore, with a single input coupling structure and a single output coupling structure it is generally not possible to transmit the entire wavelength spectrum of visible light through a single light guide. However, there is the possibility of providing the light guide with sub-light guides, each of which is designed for transmitting a different wavelength report of the visible light. In this regard, by way of example, one sub-light guide with its input coupling structure and its output coupling structure can be designed in such a way that it transmits red light, another sub-light guide with its input coupling structure and its output coupling structure can be designed in such a way that it transmits green light, and a third sub-light guide with its input coupling structure and its output coupling structure can be designed in such a way that it transmits blue light. In this way, a complete color image can be transmitted by means of three sub-light guides. This is shown schematically in FIG. 9, which shows a light guide 1 comprising three sub-light guides $1^1$, $1^2$, $1^3$ and the associated output coupling structures $13^1$, $13^2$, $13^3$. Each sub-light guide $1^1$, $1^2$, $1^3$ with its associated input coupling structure (not illustrated) and its output coupling structure $13^1$, $13^2$, $13^{3\prime}$ is designed for transmitting one color, for example the first sub-light guide $1^1$ is designed for transmitting red light, the second sub-light guide $1^2$ is designed for transmitting green light and the third sub-light guide $1^3$ is designed for transmitting blue light. Overall, therefore, a color image can be transmitted by means of the three sub-light guides $1^1$, $1^2$, $1^3$.

Figure 6:
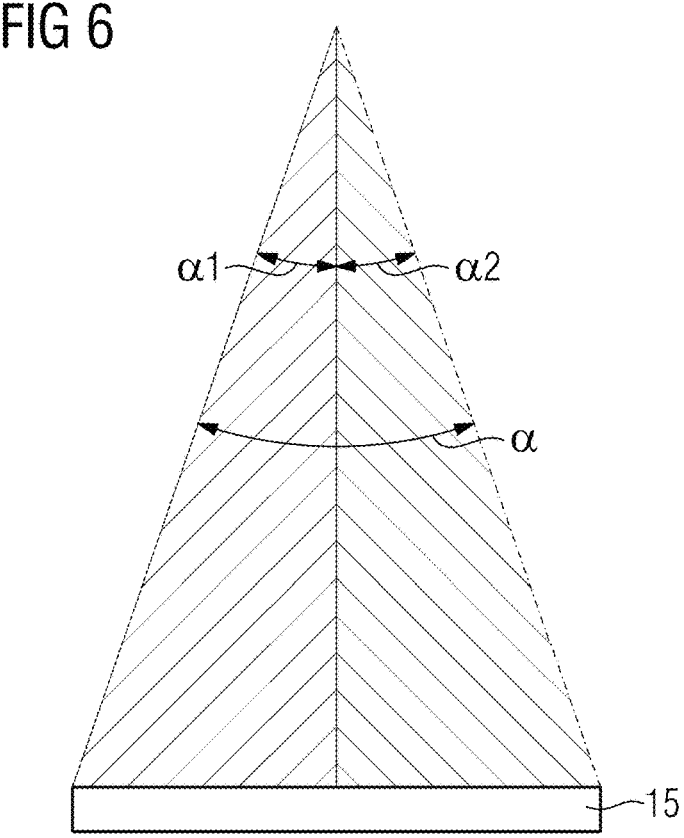
FIG. 6 is an illustration for elucidating the field angle of a display under consideration.
Figure 7:
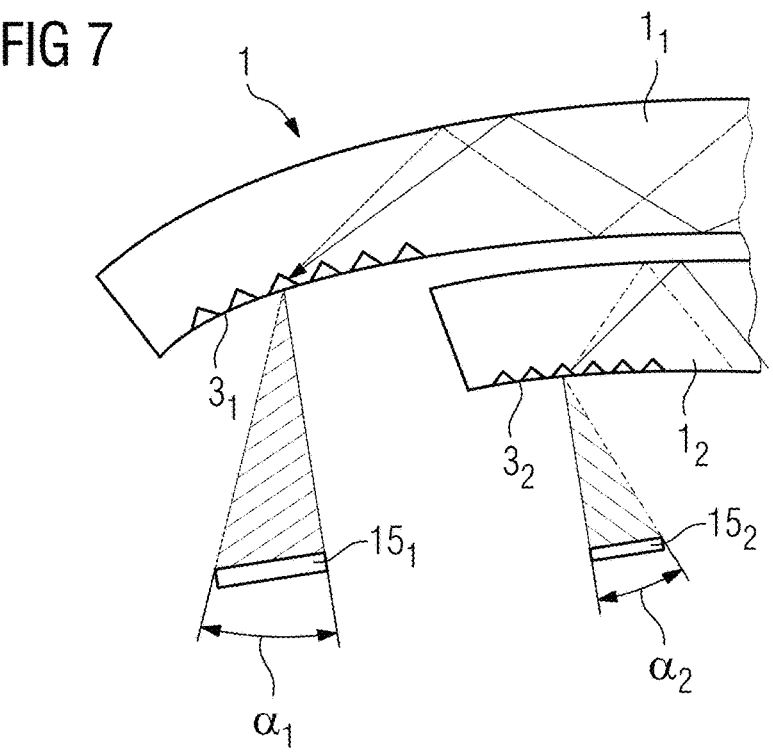
FIG. 7 shows how the field angle from FIG. 6 can be divided between two different light guides.

If, as with reference to FIGS. 6 to 8, a plurality of field angle ranges are intended to be transmitted and each field angle range is intended to represent a color image, in each case three substructures $1^1$, $1^2$, $1^3$ for red, green and blue light are necessary for each field angle range defined by a partial field angle α1, α2. Overall, in the example above, six sub-light guides are then present, three respectively for the field angle range defined by the partial field angle α1 and three respectively for the field angle range defined by the partial field angle α2. As already mentioned, the sub-light guides with diffractive input coupling and diffractive output coupling can be made rather thin, such that a light guide 1 comprising six substructures is able to be produced with an acceptable total thickness without problems.

The diffraction lens 11 illustrated in FIG. 4 is not chromatically corrected. This is associated with the fact that the angles at which constructive interference occurs depend on the wavelength of the light. The absence of chromatic correction results in an axial chromatic aberration and a lateral chromatic aberration.

In this case, the axial chromatic aberration results from the fact that the angles for the first diffraction maximum differ from one another, such that the lens has different focal lengths for different wavelengths. If the diffraction lens is designed e.g. such that its focal length for green light corresponds to the radius of curvature of the light guide, the focal length for red light is somewhat smaller and the focal length for blue light is somewhat larger than the radius of curvature of the light guide 1, with the result that a certain image unsharpness occurs in the red and blue parts of the image if the green part of the image is sharp. With a bandwidth of 50 nm with a wavelength of 500 nm (green light), the loss of sharpness as a result of the unsharpness in the red and blue constituents of the image is approximately 0.6 dpt, assuming a radius of curvature of the light guide 1 and a focal length of the diffraction lens 11 of 150 mm in each case. A loss of sharpness of 0.6 dpt can be regarded as still acceptable.

The lateral chromatic aberration is based on the different magnification resulting from the different focal lengths and thus on the different imaging scale of the individual colors in the respective focal plane. While the lateral chromatic aberration does not appear on the optical axis, it increases more and more with distance from the optical axis. If the exit pupil of the diffraction lens is 20 mm behind the output coupling structure, at the field edge of an image field of ±12° lateral chromatic aberrations occur which are of an order of magnitude of around 10 arcminutes at the field edge. Such a lateral chromatic aberration is no longer acceptable and must be corrected.

Figure 10:
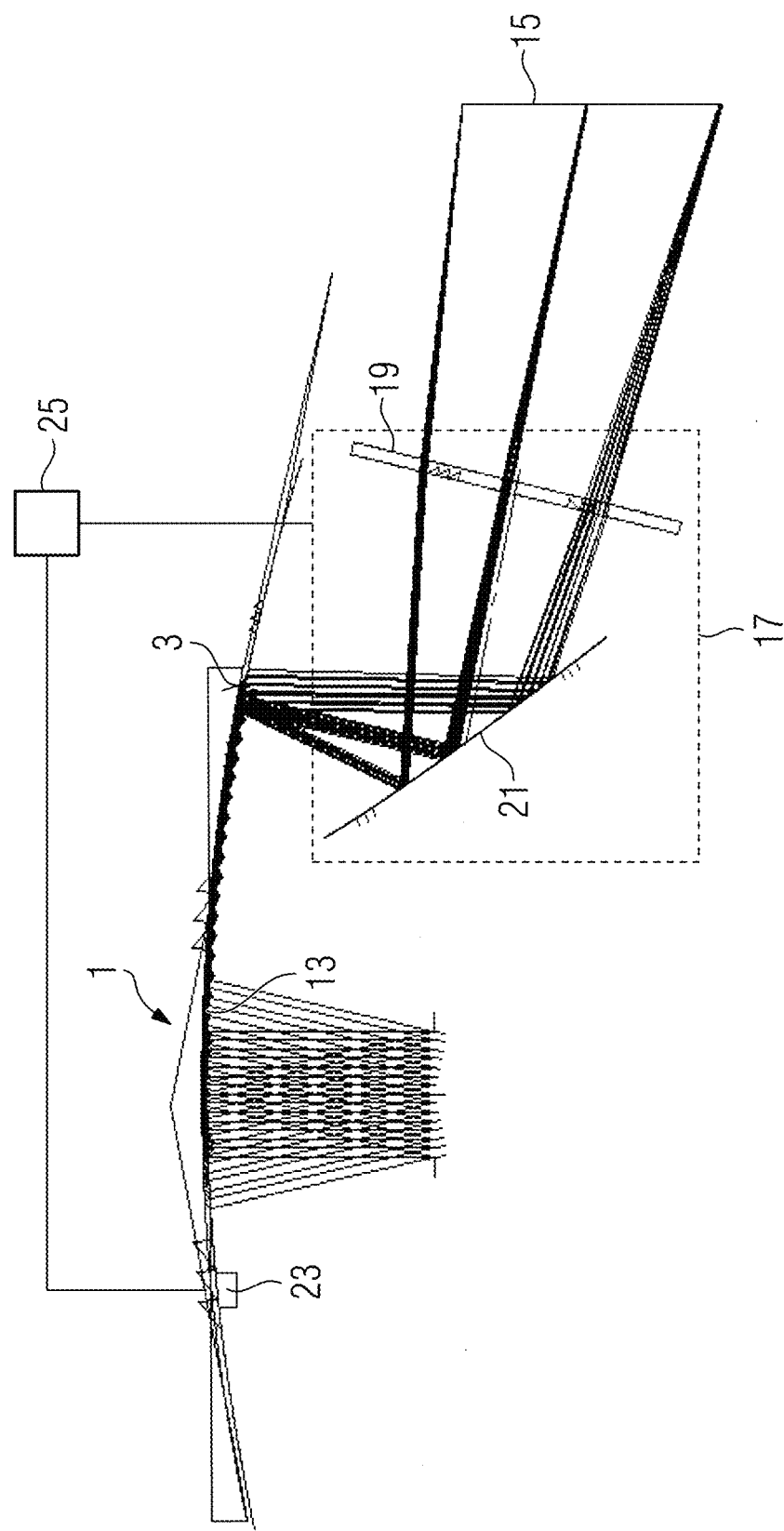
FIG. 10 shows one embodiment variant of an imaging optical unit comprising a wavefront manipulator for correcting a lateral chromatic aberration induced by the light guide.

One possibility for correcting the lateral chromatic aberration consists in a correction element being disposed upstream of the input coupling structure 3 of the light guide 1 in an imaging device comprising the light guide 1, which correction element generates an inverse lateral chromatic aberration with respect to the lateral chromatic aberration induced by the diffraction lens 11, such that the lateral chromatic aberration of the diffraction lens 11 and the lateral chromatic aberration of the correction element precisely cancel one another out. One example of such a correction element is shown in FIG. 10. The figure shows a schematic illustration of an HMD comprising an image generator 15, on which an output image is displayed, which is intended to be converted into a virtual image by an imaging optical unit. This imaging optical unit comprises, besides a light guide 1 according to the invention, a correction element 17 for correcting the lateral chromatic aberration. In the present exemplary embodiment, this correction element 17 comprises a traditionally refractive optical element 19 and a diffractive optical element 21. These two optical elements are coordinated with one another in such a way that together they induce a lateral chromatic aberration that compensates for the lateral chromatic aberration of the diffraction lens 11 of the output coupling structure 13. Furthermore, the refractive optical element 19 and the diffractive optical element 21 can be displaced relative to one another, as a result of which a dynamic lateral chromatic aberration can also be compensated for. A dynamic lateral chromatic aberration arises as a result of the user's eye movement, which has the effect that lateral chromatic aberrations occurring along edges in the field change their extent. By suitably displacing the two optical elements 19, 21 relative to one another, it is possible to compensate for the change in the extent of the lateral chromatic aberration. For this purpose, the present exemplary embodiment includes an eye tracker 23 for ascertaining the viewing direction. On the basis of the viewing direction ascertained, a control unit 25 controls the relative displacement between the refractive optical element 19 and the diffractive element 21 of the correction element 17. If the dynamic lateral chromatic aberration is not intended to be compensated for, there is the possibility of arranging the refractive optical element 19 and the diffractive optical element 21 fixedly with respect to one another and dispensing with the eye tracker 23 and the control unit 25.

The correction element 17 additionally allows, by means of suitable configuration of the refractive optical element 19 and/or of the diffractive optical element 21, compensation of the pupil distortion already mentioned above, which occurs on account of the light rays being guided along the circles of longitude.

Figure 11:
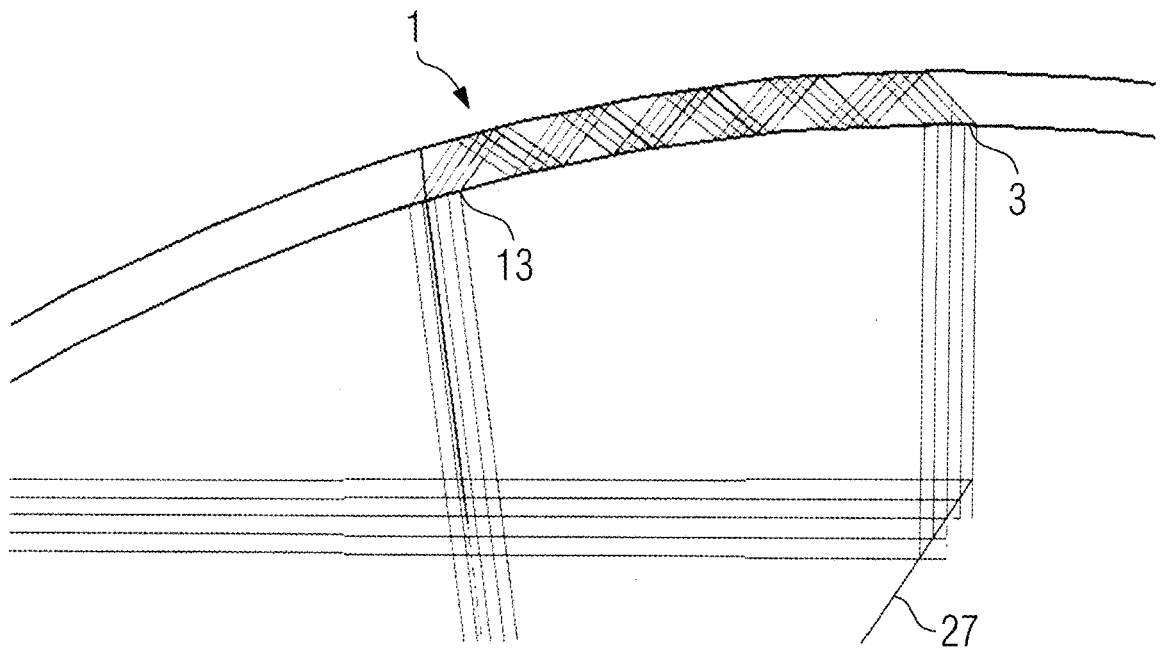
FIG. 11 shows one embodiment variant of an imaging optical unit comprising a correction element for correcting a pupil distortion induced by the light guide, said correction element being disposed upstream of the input coupling structure of the light guide.

If the intention is for only the pupil distortion to be compensated for, this is also possible using simpler means, however. FIG. 11 shows an imaging optical unit for an HMD comprising a light guide 1 according to the invention and a correction element serving only for compensating for the pupil distortion. In this case, a parabolic mirror 27 having a radius of curvature of 480 mm is used as the correction element. In this case, the radius of curvature of the light guide 1 and the focal length of the diffraction lens of the output coupling structure 13 are once again assumed to be 150 mm. The starting point of the beam of rays impinging on the parabolic mirror 27 from the left in FIG. 10 is situated outside the image at the focal point of the parabolic mirror. By means of an analogously produced quadratic pupil distortion in the longitudinal direction, it is also possible to reduce a linear astigmatism.

The pupil distortion can also be corrected by means of other off-axis elements, instead of using the correction elements described. With the correction of the pupil distortion, in particular even longer transmission lengths are possible in the light guide.

In the imaging device according to the invention, it is possible to arrange the display 15 closer to the input coupling structure if a polarization beam splitter 29 and a retardation plate 32 in the form of a λ/4 plate are disposed upstream of the input coupling structure, as is illustrated schematically in FIG. 12. The input coupling with the aid of a polarization beam splitter and a retardation plate is described e.g. in WO 2008/023367 A1, in particular with reference to FIG. 3 therein. Reference is therefore made to the disclosure of WO 2008/023367 A1 with regard to the input coupling with the aid of a polarization beam splitter and a retardation plate.

The present invention has been described in detail on the basis of exemplary embodiments for purposes of explanation. However, it is evident to a person skilled in the art that it is possible to depart from the exemplary embodiments within the scope of the invention. In this regard, by way of example, the number of partial field angles can be greater than two and the number of color channels to be transmitted can be less than or greater than three. Moreover, in principle there is the possibility of providing, instead of a diffraction lens, a refractive lens, for example a Fresnel lens, for bringing about the diverging effect. As already mentioned, the diverging effect can also be superimposed on the input coupling structure, instead of being superimposed on the output coupling structure. Moreover, there is the possibility of dividing the diverging effect and superimposing one part on the input coupling structure and the other part on the output coupling structure. Furthermore, other input coupling and output coupling structures can be employed, e.g. reflective structures such as, for instance, partly transmissive mirrors instead of diffractive structures, or the diffractive structures described can be replaced by blazed gratings. In the latter case, it is possible to optimize the diffraction structure to a specific order of diffraction by means of a suitable choice of the blaze angle. The diffraction lens can likewise be realized as a blazed grating. For coupling out a specific wavelength range, e.g. dichroitic partly transmissive mirrors can then be used. Although the output coupling structures are arranged in the back surface of the light guide in the exemplary embodiments described, they may also be arranged in the front surface, such that the light passes e.g. firstly approximately perpendicularly through the back surface and only then onto the deflecting/diffracting structure on the front surface. Accordingly, the light, after passing through the light guide, can be deflected by a deflecting/diffracting structure on the front surface in the direction of the back surface, through which it then emerges e.g. approximately perpendicularly from the light guide. Therefore, the invention is not intended to be restricted by the exemplary embodiments described, but rather only by the appended claims.

The invention claimed is:

1. A curved light guide for a Head Mounted Display (HMD), wherein the light guide is arranged in front of an eye of a user, and wherein the light guide has a spherical concave curvature as seen from the eye, which defines a radius of curvature, the light guide comprising:
 a back surface facing the eye;
 a front surface facing away from the eye;
 a maximum outer latitudinal circumferential line defining an equator of the light guide;
 a plurality of lines of longitude defined at right angles to the equator, wherein light rays coupled into the light guide are coupled in parallel to the plurality of lines of longitude;
 an input coupling structure for coupling light into the light guide such that light is guided through the light guide with reflection at one or both of the front surface and the back surface; and
 an output coupling structure for coupling out the light guided through the light guide,
 wherein the light guide includes a structure to diverge light being guided through the light guide such that the diverged light defines a focal length, wherein an absolute value of the focal length of the diverged light is less than or equal to the radius of curvature of the light guide,
 wherein the input coupling structure is configured such that it couples rays of light into the light guide such that the rays of light that are coupled in pass in the light guide along circles of longitude of the light guide, and
 wherein the output coupling structure lies closer to the equator of the light guide than the input coupling structure.

2. The light guide of claim 1, wherein the structure to diverge light is superimposed on one or both of the output coupling structure and the input coupling structure.

3. The light guide of claim 1, wherein the structure to diverge light is a diffraction lens.

4. The light guide of claim 3, wherein the diffraction lens comprises zones which differ from one another in terms of their optical path length for the light guided through the light guide.

5. The light guide of claim 3, wherein the diffraction lens comprises transparent and nontransparent zones.

6. The light guide of claim 1, wherein the structure to diverge light has a diverging effect that is centered on a center of an image field.

7. The light guide of claim 1, wherein the light to be coupled into the light guide has an angular spectrum and/or a spectral range, and wherein the input coupling structure and the output coupling structure each comprise a plurality of substructures which respectively couple different parts of the spectral range and/or different parts of the angular spectrum into the light guide and out of the light guide.

8. The light guide of claim 7, further comprising a plurality of sub-light guides, each of which respectively guides a different one of the different parts of the spectral range and/or of the different parts of the angular spectrum from the input coupling structure to the output coupling structure.

9. The light guide of claim 1, wherein the input coupling structure is arranged in the light guide such that the input coupling of the light can take place through the back surface of the light guide.

10. An imaging optical unit comprising an imaging beam path and a light guide according to claim 1, wherein the light guide serves as an image-forming optical element.

11. The imaging optical unit of claim 10, further comprising a correction element for correcting in advance a distortion of a virtual image seen from the eye of the user, which is induced by a pupil of the light guide, the correction element disposed upstream of the input coupling structure of the light guide in the imaging beam path.

12. The imaging optical unit of claim 10, further comprising a compensation optical unit, which compensates for a lateral chromatic aberration induced by the light guide, wherein the compensation optical unit is disposed upstream of the input coupling structure of the light guide in the imaging beam path.

13. The imaging optical unit of claim 12, wherein the compensation optical unit comprises a diffractive optical element and a refractive optical element, which are arranged such that they are displaceable relative to one another perpendicular to an optical axis of the imaging beam path, and the imaging optical unit further comprises an eye tracker.

14. The imaging optical unit of claim 10, further comprising a polarization beam splitter and a retardation plate, each being disposed upstream of the input coupling structure of the light guide in the imaging beam path.

15. An HMD comprising a display for displaying an output image and an imaging optical unit according to claim 10 for generating a virtual image from the output image, the virtual image being situated beyond the light guide, as seen from the eye of the user wearing the HMD.

16. An imaging optical unit comprising:
an imaging beam path;
an eye tracker to determine a viewing direction;
a control unit;
a light guide, wherein the light guide serves as an image-forming optical element, wherein the light guide is arranged in front of an eye of a user, and wherein the light guide has a concave curvature as seen from the eye, which defines a radius of curvature, the light guide comprising:
a back surface facing the eye;
a front surface facing away from the eye;
an input coupling structure for coupling light into the light guide such that light is guided through the light guide with reflection at one or both of the front surface and the back surface; and
an output coupling structure for coupling out the light guided through the light guide,
wherein the light guide includes a structure to diverge light being guided through the light guide such that the diverged light defines a focal length, wherein an absolute value of the focal length of the diverged light is less than or equal to the radius of curvature of the light guide,
a compensation optical unit, which compensates for a lateral chromatic aberration induced by the light guide, wherein the compensation optical unit is disposed upstream of the input coupling structure of the light guide in the imaging beam path,
wherein the compensation optical unit comprises a diffractive optical element and a refractive optical element, which are arranged such that they are displaceable relative to one another perpendicular to an optical axis of the imaging beam path, and
wherein the control unit controls the relative displacement between the refractive optical element and the diffractive element based upon the viewing direction.

* * * * *